April 2, 1957 — J. F. ROBERTS — 2,787,491
COMBINATION GARDEN TOOLS
Filed May 25, 1955 — 3 Sheets-Sheet 1
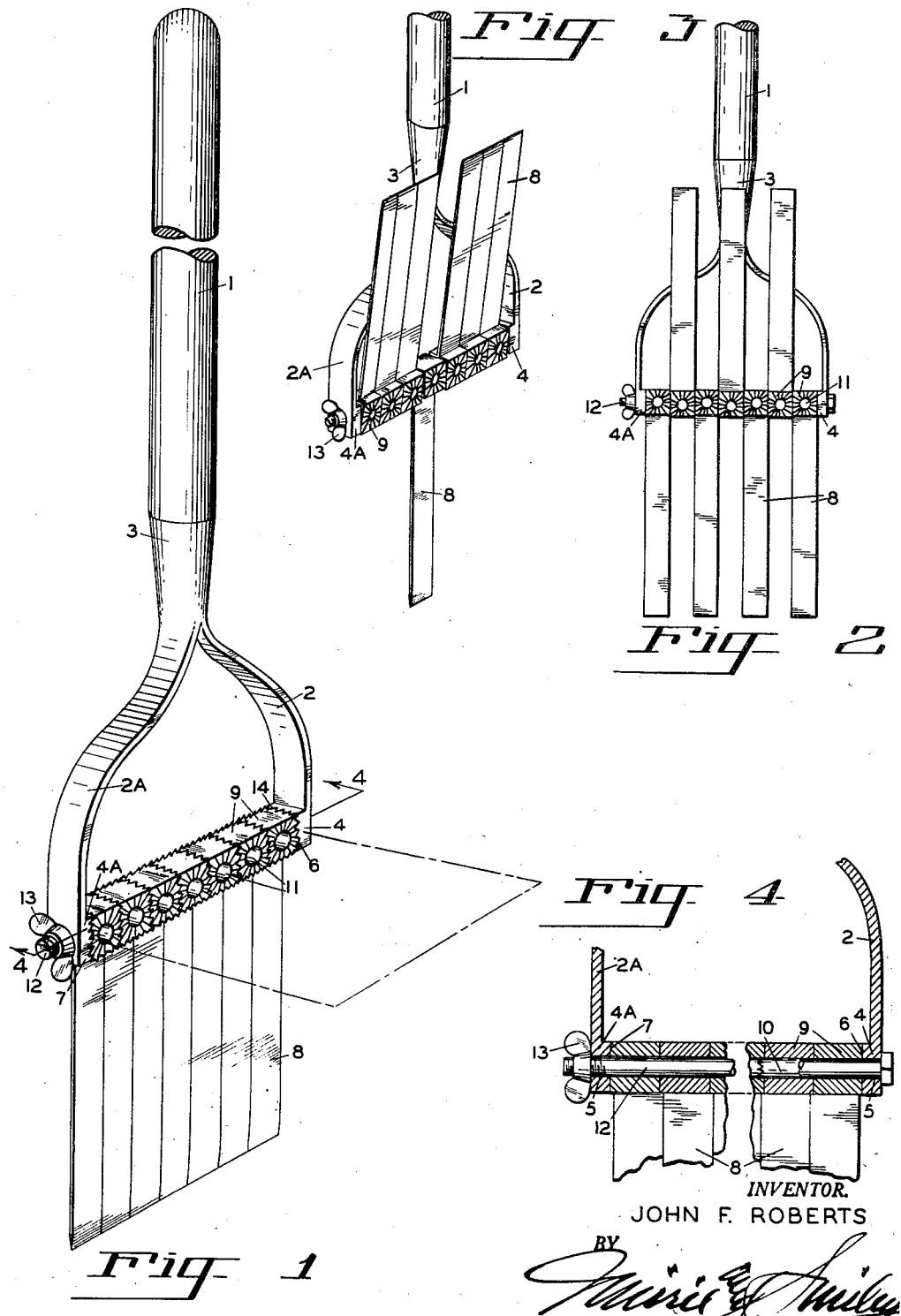
INVENTOR.
JOHN F. ROBERTS

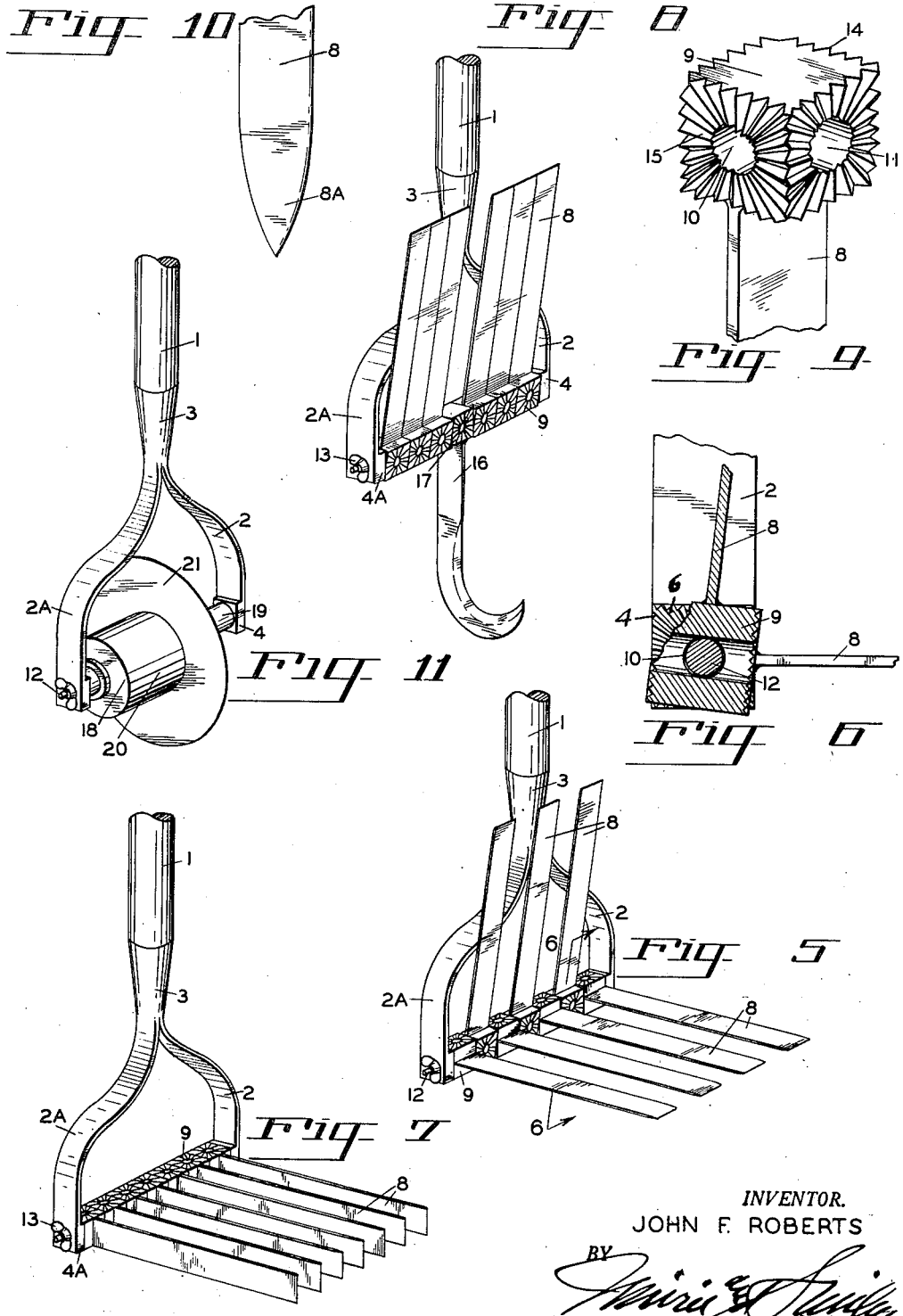

April 2, 1957
J. F. ROBERTS
2,787,491
COMBINATION GARDEN TOOLS
Filed May 25, 1955
3 Sheets-Sheet 3
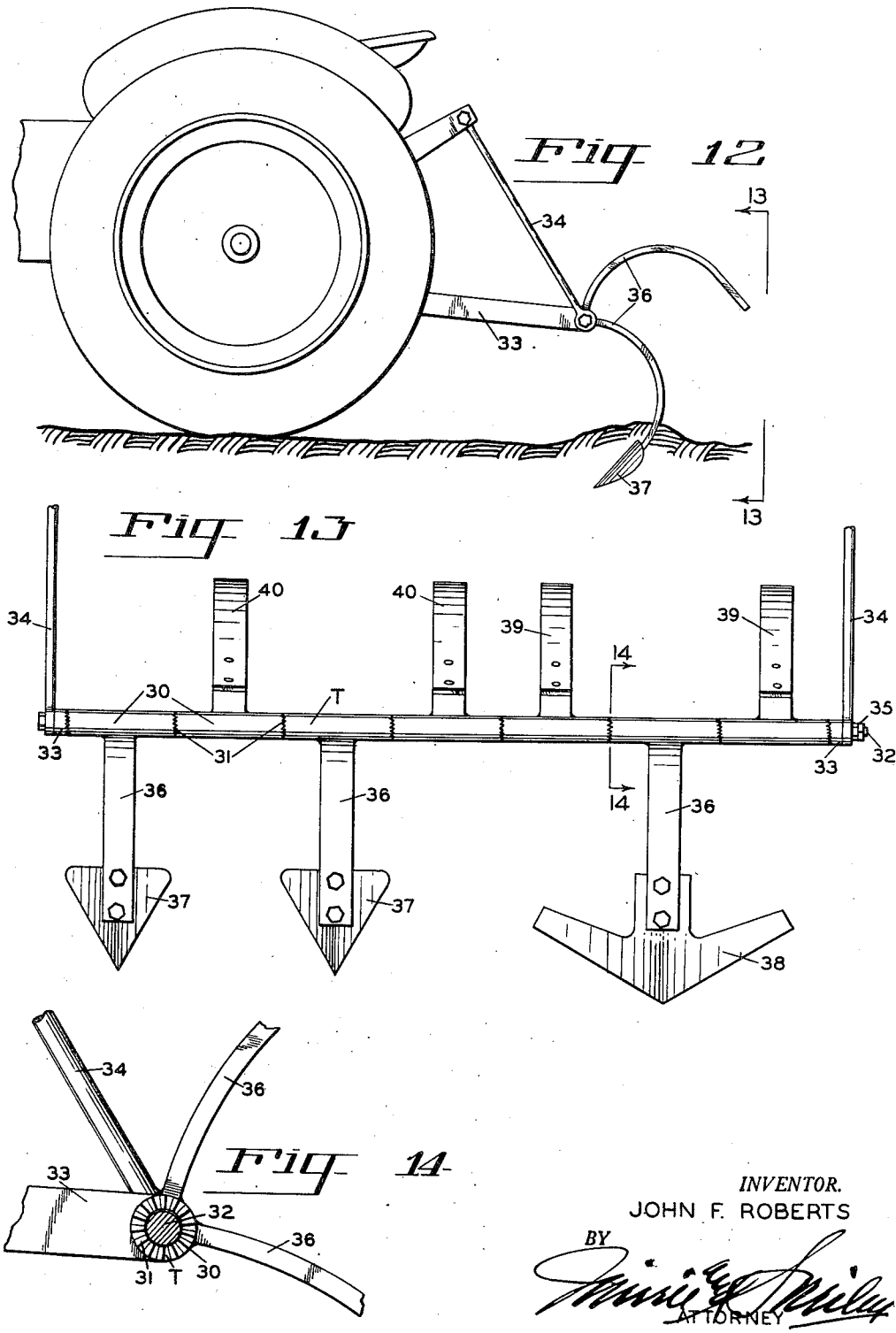
INVENTOR.
JOHN F. ROBERTS
BY
ATTORNEY

United States Patent Office 2,787,491
Patented Apr. 2, 1957

2,787,491

COMBINATION GARDEN TOOLS

John F. Roberts, Portland, Oreg.

Application May 25, 1955, Serial No. 510,923

5 Claims. (Cl. 294—51)

This invention relates to agricultural implements and more particularly to a combination agricultural tool.

It is among the primary objects of the invention to provide a novel, simple and improved agricultural tool which could be used as a shovel, hoe, fork, rake and pruning device.

Another object of the invention is to provide an agricultural implement comprising but a few similar elements and by adjusting the position of some of said elements the device may be used as a shovel, hoe or other tools used in gardening.

It is a further object of the invention to provide an implement that could be used as a lawn edger, and also adaptable for use as a hand tool or a tractor implement.

It is a still further object of the invention to provide a combination agricultural tool wherein the various implements can be brought into operation with a minimum of mechanical effort.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a perspective view of the agricultural implement in the form of a hand tool as it would be used as a shovel, with part of the handle broken away for convenience of illustration;

Figure 2 illustrates the tool as it would appear when using the same as a fork;

Figure 3 illustrates the tool when used as a weeder;

Figure 4 is a fragmentary detail section view on a larger scale, taken on line 4—4 of Figure 1;

Figure 5 illustrates the tool when used as a blade type of rake;

Figure 6 is a fragmentary detail on a larger scale, taken on line 6—6 of Figure 5;

Figure 7 illustrates the tool when used as a narrow tooth rake;

Figure 8 shows the tool when used as a pruning tooth;

Figure 9 is an enlarged fragmentary detail perspective view of one of the blades;

Figure 10 illustrates another preferred form of a blade tip;

Figure 11 illustrates a modification wherein the tool is constructed to be used as a lawn edger;

Figure 12 illustrates another modification of the device wherein invention is adapted to tool bars of tractors and the like;

Figure 13 is an enlarged rear view, taken on line 13—13 of Figure 12, and

Figure 14 is an enlarged sectional view, taken on line 14—14 of Figure 13.

Referring now to the drawings and more specifically to Figs. 1 to 4, the tool comprises a handle 1 of any desired length suitable for gardening work. Forming part of the handle are a pair of metal arms 2 and 2A joined at their upper ends into a handle socket 3. The lower ends of the arms are provided with bosses 4 and 4A respectively each having an opening 5 formed therein. The bosses 4 and 4A may be provided with clutch means or the like, such as radial serrations or radial tongues 6 and radial grooves 7 respectively.

A plurality of narrow flat blades 8, each having an enlarged square shaped hub 9 at one end thereof, are supported by the arms 2, 2A between the bosses 4, 4A. The hubs 9 are provided with holes 10 and 11 extending at right angles with each other, and the blades are supported by means of a bolt or rod 12 which passes through the openings 5 in the arms and through either the hole 10 or 11 in each hub 9, depending on whether the blades 8 are supported either parallel or perpendicular to the bolt. The end of the blades 8, opposite the hub, may be either square, as shown in Figs. 1 to 5 and 7, or pointed, as shown in Fig. 10. The hubs 9 may be adapted to be selectively fixed relative to the rod 12, as by square holes and rod, or by clutch means enabling cooperation with each other and the bosses 4 and 4A. In the latter event, each hub 9 has its side surfaces provided with clutch means such as radial serrations forming either grooves 14 or tongues 15. These grooves and tongues interengage one another when the blades 8 are assembled on the bolt 12.

When the tool is assembled as a shovel or hoe, the bolt 12 passes through the holes 10 in the hub 9, as best illustrated in Fig. 4. As the blades 8 are assembled in the position shown, the arms 2 and 2A are clamped tightly against the hubs 9 and the hubs are clamped together by way of the wing nut 13 on the bolt 12. The tongues 6 of the boss 4 enter the grooves 14 of the hub 9 of the adjacent blade, while the tongues 15 of the said hub enter the grooves 14 of the adjacent hub and so on. The blades are held in the selected position when the wing nut 13 is tightened on the bolt 12.

The blades 8 may be disposed in a substantially straight position, as shown in full lines in Fig. 1, for use as a shovel. If the tool is to be used as a hoe, the wing nut 13 is loosened, the blades are revolved to an angular position, as shown in broken lines in Fig. 1, the hubs 9 being pivoted relative to the bosses 4 and 4A of the arms 2 and 2A. When the tool is being used as a fork, alternative blades are swung upwardly, as shown in Fig. 2. When the tool is used as a weeder, all but one blade are moved to an upward or backward position, as shown in Fig. 3. One blade 8 may be removed and a pruning knife 16 substituted, as shown in Fig. 8, the pruning knife having a hub 17 identical to the hubs 9. The blades 8 may be turned to a position to create a flat bladed rake, as shown in Fig. 5 or hubs 9 may be threaded on the bolt 12 through their holes 11 and swung perpendicular to the handle to form a sharp toothed rake, as shown in Fig. 7.

Referring now to Figure 11, the blades 8 and their hubs 9 may be removed and a lawn edger assembly 18 and a spacer 19 may be mounted on the bolt 12. The lawn edger assembly consists of an enlarged hub 20, having the cutting disk 21 forming part thereof. The hub 20 is adapted to run on edges of sidewalks and the like, while the blade 21 cuts and edges the grass along the walk. Parts 18 and 19 are provided with grooves and tongues to engage the tongues and grooves of the bosses 4 and 4A of arms 2 and 2A, in the same manner as shown in Fig. 1.

In the operation and conversion of the tool from one implement to the other, the operator loosens the wing nut 13 permitting the arms 2 and 2A to spread sufficiently to disengage the clutch means so that the hubs 9 of the blades 8 can be revolved to any desired position as indicated in the various figures of the drawings. After the blades are properly positioned, the wing nut 13 is re-tightened and the bosses 4 and 4A clamped against the hubs 9 of the blades, holding the hubs and blades in the desired position.

While the foregoing description of the invention has been described in connection with a hand tool, it is equally applicable to large tractor implements, as shown in Figs. 12 to 14. According to this arrangement, the implement may include a tool bar T comprising a rod 32 carried by draw bars 33 and hangers 34. The rod may have a head at one end and threads into the other end for cooperating with nuts 35. The implements include hubs 30 having clutch means or interlocking tongues and grooves on their ends, as best shown in Figs. 13 and 14. The hubs 30 are all mounted on the transverse rod 32 between the draw bars 33 and the hangers 34 and are held in locked position by the nuts 35. By loosening the nuts 35 on rod 32, the hubs 30 may be disengaged and selectively adjusted about the rod 32.

Tool arms 36 project from the hubs 30 and have cultivator blades 37 and/or 38 bolted thereto in the usual manner. As shown in Fig. 13, the arms 36 may be disposed in working position while other arms 39 and 40 may be revolved to inoperative positions. The cultivator blade 38, as shown, may be a wide blade so that the tool arms 39 on either side thereof are moved rearwardly to inoperative positions. When two blades 37 are used, the intermediate or alternate arms 40, between arms 36 are moved to inoperative position. Any combination or type of cultivator blades can be used with this invention, and while a particular type of tool bar T and implement has been disclosed, the invention is readily adapted to various other forms of bars and kinds of implements and for use with or without tractor power.

Although certain specific embodiments of the invention have been shown and described, it is obvious that many modifications thereof are possible. The invention, therefore, is not to be restricted except insofar as is necessitated by the prior art and by the spirit of the appended claims.

What I claim is:

1. A combination agricultural apparatus comprising a support including a pair of arms, a bolt spanning the ends of the arms and held in place by a nut and a plurality of similar flat elements each having a rectangular hub provided with a pair of apertures at right angles to each other, said bolt passing through either one of said pair of apertures and supporting said flat elements, said hubs having interengaging means and held in any desired locked position whereby the apparatus may be used as either a shovel, hoe, fork, rake or a tractor tool bar.

2. A combination agricultural apparatus as defined in claim 1, wherein the arms are provided with apertured bosses having serrations on their faces and wherein the interengaging means of the hubs comprise grooves and tongues for locking engagement of the elements with each other as well as with the bosses of the arms.

3. A combination garden tool comprising a handle, a yoke projecting from one end of the handle, a bolt spanning the arms of the yoke and held in place by a nut, a plurality of flat blades each having a rectangular hub provided with a pair of apertures at right angles to each other, said bolt passing through either one of said pair of apertures and supporting said flat elements, the ends of said arms and the faces of the hubs being provided with interengaging means whereby said blades may be held in any desired locked position.

4. A combination garden tool as set forth in claim 3, wherein the interengaging means comprise tongues and grooves whereby the tongues on one surface of a hub interengage the grooves on the surface of an adjacent hub to lock the blades in desired position.

5. A combination garden tool as set forth in claim 3, wherein the yoke is Y-shaped, apertures bosses on the ends of the projecting arms of the yoke, and serrations on the face of each boss extending from the aperture outwardly.

References Cited in the file of this patent

UNITED STATES PATENTS

| 810,987 | Spicer | Jan. 30, 1906 |
| 975,320 | Bilsland | Nov. 8, 1910 |

FOREIGN PATENTS

| 141,591 | Australia | June 15, 1951 |